United States Patent
Gutierrez et al.

(10) Patent No.: US 11,987,759 B2
(45) Date of Patent: *May 21, 2024

(54) SOLVOLYSIS PROCESS

(71) Applicant: UPM-KYMMENE CORPORATION, Helsinki (FI)

(72) Inventors: Andrea Gutierrez, Helsinki (FI); Roel Westerhof, Enschede (NL); Sascha Kersten, Enschede (NL); Bert Heesink, Enschede (NL); Pekka Jokela, Helsinki (FI)

(73) Assignee: UPM-KYMMENE CORPORATION, Helsinki (FI)

(*) Notice: Subject to any disclaimer, the term of this patent is extended or adjusted under 35 U.S.C. 154(b) by 0 days.

This patent is subject to a terminal disclaimer.

(21) Appl. No.: 18/083,698

(22) Filed: Dec. 19, 2022

(65) Prior Publication Data

US 2023/0203383 A1 Jun. 29, 2023

(30) Foreign Application Priority Data

Dec. 23, 2021 (FI) ..................................... 20216331

(51) Int. Cl.
*C10G 3/00* (2006.01)
*C10G 49/26* (2006.01)

(52) U.S. Cl.
CPC .................. *C10G 3/52* (2013.01); *C10G 3/60* (2013.01); *C10G 49/26* (2013.01);
(Continued)

(58) Field of Classification Search
CPC . C10G 3/52; C10G 3/60; C10G 49/00; C10G 49/26; C10G 2300/1014;
(Continued)

(56) References Cited

U.S. PATENT DOCUMENTS

| | | | |
|---|---|---|---|
| 4,900,873 A | 2/1990 | Kakemoto et al. | |
| 8,252,141 B2* | 8/2012 | Stigsson ............ | D21C 11/0007 162/29 |

(Continued)

FOREIGN PATENT DOCUMENTS

| | | |
|---|---|---|
| SE | 1951187 A1 | 11/2019 |
| SE | 542463 C2 | 5/2020 |

(Continued)

OTHER PUBLICATIONS

Yan et al. ("Thermal decomposition of kraft lignin under gas atmospheres of argon, hydrogen, and carbon dioxide." Polymers 10.7 (2018): 729) (Year: 2018).*

(Continued)

*Primary Examiner* — In Suk C Bullock
*Assistant Examiner* — Jason Y Chong
(74) *Attorney, Agent, or Firm* — CANTOR COLBURN LLP (57) ABSTRACT

The present disclosure relates to the thermal liquefaction of lignin, and more particularly to lignin solvolysis of a lignin feedstock chosen based on its molecular weight. The process comprises subjecting a feed mixture (30) of lignin feedstock (10) and solvent (20) to a thermal liquefaction step by heating (110) the feed mixture (30) at a temperature between 360 and 420° C., separating (120) a liquid product mix (50) from a product mix (40); and recirculating at least part of said liquid product mix (50) as an oil fraction of said solvent (20).

23 Claims, 3 Drawing Sheets (52) U.S. Cl.
CPC .......... *C10G 2300/1014* (2013.01); *C10G 2300/4006* (2013.01); *C10G 2300/4012* (2013.01); *C10G 2300/4081* (2013.01); *C10G 2300/44* (2013.01)

(58) Field of Classification Search
CPC .... C10G 2300/4006; C10G 2300/4012; C10G 2300/4081; C10G 2300/44; C10G 1/02; Y02P 30/20
See application file for complete search history.

(56) References Cited

U.S. PATENT DOCUMENTS

| | | |
|---|---|---|
| 2018/0265794 A1 | 9/2018 | Dahlstrand et al. |
| 2020/0231879 A1* | 7/2020 | Chauhan .......... C10G 47/00 |

FOREIGN PATENT DOCUMENTS

| | | |
|---|---|---|
| WO | 2012005784 A1 | 1/2012 |
| WO | 2021209555 A1 | 10/2021 |

OTHER PUBLICATIONS

Yoo et al., "Opportunities and Challenges of Lignin Utilization", American Chemical Society, 2021; 12 pages.

* cited by examiner

SOLVOLYSIS PROCESS

CROSS REFERENCE TO RELATED APPLICATION

This application claims priority to Finnish Patent Application No. 20216331 filed Dec. 23, 2021, which is fully incorporated herein by reference.

FIELD OF THE DISCLOSURE

The present disclosure relates to the thermal liquefaction of lignin, and more particularly to lignin solvolysis of a lignin feedstock chosen based on its molecular weight. More in detail the disclosure relates to a process for converting lignin to renewable liquid product(s), wherein the process comprises subjecting a feed mixture of lignin feedstock and solvent to a thermal liquefaction step by heating the feed mixture at high temperatures and moderate pressure, separating a product mix or liquid product mix and recirculating at least part of the product mix or liquid product mix as an oil fraction of the solvent. The present disclosure further relates to the use of the obtained product(s).

BACKGROUND OF THE DISCLOSURE

Biomass is increasingly recognized as a valuable feedstock to be used as a sustainable alternative to petroleum for the production of biofuels and chemicals.

Renewable energy sources represent the potential fuel alternatives to overcome the global energy crises in a sustainable and eco-friendly manner. In future, biofuels and biochemicals may replenish the conventional non-renewable energy resources due to their renewability and several other advantages.

Biofuels and biochemicals are typically manufactured from feedstock originating from renewable sources, including oils and fats obtained from plants, animals, algal materials and fish. One source is lignocellulosic biomass, which refers to plant biomass that is composed of cellulose, hemicellulose, and lignin. Biofuels and biochemicals originating from lignocellulosic biomass can replace fossil fuels from an energy point of view. However, the conversion of cellulose and hemicellulose into fuels and chemicals often leaves lignin as a by-product and lignin removed for example by the kraft process is traditionally burned for its fuel value, providing energy to power the mill.

After cellulose, lignin is the most prevalent biopolymer on earth, but in contrast to other polymers, lignin is more resistant to degradation. Although, utilization of lignin as a renewable polymeric material is recognized, lignin utilization is still limited, especially since high-lignin containing biomasses are susceptible to tar and char formation, and often produce significant amount of solid residues.

Converting biomass into renewable fuels and chemicals usually involves thermal treatment of the biomass and a promising technology is Hydrothermal Liquefaction (HTL). HTL is usually carried out with liquid water at temperatures between 320° C. and 400° C. To keep the water in the liquid state or supercritical state very high operational pressures of 200 bar or above are needed.

Despite the ongoing research and development in the processing of feedstocks and manufacture of fuels, there is still a need to provide an improved process for converting biomass, particularly lignin, to valuable chemicals and hydrocarbons suitable as fuels or fuel blending components.

BRIEF DESCRIPTION OF THE DISCLOSURE

The invention provides methods for producing renewable liquid product(s) from lignin feedstock obtained from different sources, having an average molecular weight below 6500 g/mol. The method generally involves providing lignin feedstock in a feed mixture to be used in a thermal treatment process, preferably a continuous thermal treatment process. A renewable product consisting mainly of oxygen containing hydrocarbons is produced and the product can be used as such, can be upgraded or can be used in the process as the sole solvent, or part of the solvent.

The disclosure is based on the idea of using a lignin feedstock with a specified average molecular weight distribution, as feedstock for thermal treatment. Optionally the average molecular weight is used in combination with polydispersity of the lignin feedstock, A process comprising providing a feed mixture of lignin feedstock and solvent comprising an oil or oil fraction, at least partly produced by the process, followed by thermal conversion treatment by solvolysis of the feed mixture, is provided. The solvolysis of the process can be operated at moderate pressure, still obtaining high yields of liquids. In the pretreatment step for providing the feed mixture of the process, the lignin feedstock is mixed with the solvent, whereas in the solvolysis step the feed mixture is liquefied.

An advantage of the process of the disclosure is that the main challenges of prior art hydrothermal liquefaction are avoided, i.e. feeding of the reaction slurry to the reactor at high pressures and temperatures, operating at high pressures associated with the presence of water at high temperatures, operating near supercritical temperature and pressure of water and recovering product at high pressure. Moreover, high temperatures and pressure of water (including salts) under supercritical conditions lead to precipitation of salts that blockage the equipment, which can now be avoided. Further, special materials needed due to harsh conditions or higher amount of aqueous phase or wastewater, resulting in high investment costs for HTL plants, can be avoided.

The use of a lignin fraction(s) suitable for the process of the disclosure as lignin feedstock, allows the use of lower temperatures in the solvolysis step of the process. Further, when an optimized lignin feedstock, with a predefined molecular weight is treated by solvolysis, heavy fractions after solvolysis can be avoided. Heavy fractions are known to coke at hydrotreatment conditions and thus, the product of solvolysis using lignin fraction(s) is more suitable to hydrotreatment. Thereto, when heavy fractions obtained from distillation of the solvolysis product are minimized, the yield of the hydrotreatable oil (molecules with smaller $M_w$) yield increases, which is suitable as a product as such or for further treatment. Further, solid fractions after distillation can be avoided or at least minimized.

If the lignin feedstock, typically a fraction of lignin, is obtained from kraft lignin, the process of the disclosure can alternatively, or in addition, be integrated to a pulp mill. Further, the water from the solvolysis, that is introduced with the feed and/or formed in the process, can optionally be returned to the pulp mill. The formation of aqueous phase in solvolysis indicates that deoxygenation took place during the reaction.

Further integration of a pulp mill with the process for converting fractions of lignin to a renewable product is achieved when lignin is extracted from black liquor, the liquid separated from pulp in kraft pulping. Extracting the lignin from the back liquor also causes off-loading of the recovery boiler of the pulp mill. Thereto fractions unsuitable for solvolysis can be returned to the pulping process. Further, as the separation of kraft lignin takes place before the solvolysis, the cooking chemicals are returned to the pulping process at an earlier stage, making sure that the chemical balance of the pulp mill is maintained.

Recirculating oil or an oil fraction of the product, such as a light fraction or a medium fraction, obtained after fractionation, as solvent in the solvolysis step increases the oil yield and helps avoiding formation of coke and undesired polymerization reactions. Further, the amount of oxygen in the oil products decreases. By adjusting process conditions, the oxygen content of the oil products can be altered where lower oxygen contents correspond to a product of better quality.

In order to reduce the consumption of external energy, heat from one or more product streams can be used to heat up feed streams.

The process of the disclosure is especially suitable for converting lignin to valuable chemicals, such as hydrocarbons and/or oxygen containing hydrocarbons suitable as fuels, as fuel blending components or as feedstock for fuels and in chemicals production.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

An industrially effective and sustainable process for recovering renewable products from lignin is provided, with high yield of liquid product(s), and where lignin feedstock is effectively and economically converted to renewable products. The liquid product(s) and especially fractions thereof are particularly suitable as feedstock for hydroprocessing in biofuels and biochemicals manufacture.

A process is proposed for converting lignin feedstock to renewable liquid product(s) as well as use of the obtained product(s). The object of the disclosure is achieved by the process and use of the obtained product(s) as characterized by what is stated in the independent claims. The preferred embodiments of the disclosure are disclosed in the dependent claims.

According to an embodiment of the disclosure the pretreatment step of the process comprises preparing a feed mixture by mixing lignin feedstock with a solvent, comprising an oil fraction which at least partly is produced by the process, at a temperature between 100 and 130° C., at a pressure from 1 to 10 bar, for 5-30 min. The mixing of the feedstock can be facilitated by mechanical treatment using different kind of mechanical equipment such as stirrer, pump etc, for example a piston pump. The obtained feed mixture is pumpable. During the mixing the lignin feedstock dissolves, at least partly, in the solvent.

In embodiments of the disclosure, a feed mixture is, typically after an optional pretreatment step, fed to a thermal conversion step, a solvolysis step by thermal liquefaction, where the mixture is heated to a temperature between 360 and 420° C. At this temperature the pressure increases up to between 40 (4 MPa) and 155 bar (15.5 MPa). The reaction time, or the residence time in case this step is part of the continuous process, i.e. the time the temperature and pressure of the solvolysis step is maintained, is typically 3-60 minutes, preferably 5-40 minutes, most preferably 5-30 minutes. A product mix is obtained, and it is typically directed to a separation step, typically comprising washing and/or filtration, where solids/char is typically separated from the liquid product(s). Typically, if an aqueous phase is formed during the thermal liquefaction, it is separated from the product before the product mix or a fraction of the product mix is recirculated or processed further. The aqueous phase can be removed by decanting or as part of the washing. Water can be formed in the solvolysis due to deoxygenation reactions. Typically, the separated solids form a cake comprising oil. In order to increase the oil yield, this oil is optionally separated from the solids by washing or separating by steam. Optionally the solids are first washed and then separated for example by filtration, sedimentation and/or decanting. The solids, if present and separated, are typically unconverted heavy compounds of lignin or the result of polymerization at the reaction conditions. At least part of said liquid product(s) are recirculated back to the pretreatment step as the oil fraction of said solvent. Typically, the oil fraction is a fraction obtained after separation and/or fractionation of the product mix obtained from the thermal liquefaction, such as the liquid product mix or a fraction obtained from fractionation, such as a light or medium fraction.

According to embodiments of the disclosure the product mix or part of it, is directed to fractionation before recirculating part of the liquid product to the pretreatment step. Typically, a light fraction and a heavy fraction as well as optionally gases and a bottom residue fraction are separated. In some embodiments of the disclosure also one or more medium fractions are separated. The fractionation may be for example fractional distillation utilizing at least one fractionation distillation column. Typically, the light fraction or medium fraction is the part of the product mix used as oil fraction in the solvent in the thermal liquefaction of the process and optionally part of the fraction(s) is upgraded by hydroprocessing. Optionally part of the product mix is directed to hydroprocessing, such as hydrotreatment or hydrocracking instead of or in addition to being directed to fractionation.

In the present specification and claims, the following terms have the meanings defined below.

The term "lignin feedstock" as used herein, refers to lignin obtained from different lignin sources. The lignin feedstock is typically a fraction of lignin chosen based on its average molecular weight. One example is lignin feedstock obtained from kraft lignin, but the lignin could also be obtained from other sources such as lignosulfonate lignin, soda lignin, organosolv lignin or lignin obtained from lignocellulosic ethanol process. More in general lignin is a complex water-insoluble, long-chain heterogeneous organic polymer composed largely of phenylpropane units which are most commonly linked by ether bonds. Oxidative coupling of primarily three p-hydroxycinnamyl alcohols (monolignols): p-coumaryl, coniferyl and sinapyl alcohols results in lignin. Lignin have generally been classified into three major groups based on the chemical structure of their monomer units: softwood lignin, hardwood lignin, and grass lignin. Hardwood lignin consists mainly of guaiacyl and syringyl units and low levels of p-hydroxyphenyl. Conifer lignin has higher levels of guaiacyl units and low levels of p-hydroxyphenyl. Grasses comprise guaiacyl, syringyl and p-hydroxyphenyl units. In some embodiments of the disclosure, the feedstock is typically a fraction of kraft lignin, which is separated from black liquor. The feedstock of kraft lignin essentially consists of lignin, i.e. the feedstock is substantially free of impurities or residues from black liquor, such as cellulose, hemicellulose, methanol, sulphur compounds and cooking chemicals from the kraft process.

The term "solvent", as used herein, refer to the solvent used for pretreatment of the lignin feedstock of the process. The solvent comprises an oil fraction, at least partly recirculated from the process itself, typically a fraction of the product mix, such as a light or medium fraction separated by fractionation. The solvent may further comprise, renewable hydrocarbons, oxygen containing hydrocarbons or mixtures thereof. In embodiments where the solvent is entirely recirculated from the process itself, the lignin feedstock is the sole feedstock added as feed in the process of the disclosure.

The term "oil fraction", as used herein, refer to the product mix or part thereof obtained from the continuous thermal liquefaction of the process and recirculated to the pretreatment to be, at least part of, the solvent of the process.

The term "feed mixture" is the homogeneous or heterogenous mixture obtained after mixing lignin feedstock with solvent according to the disclosure.

The kraft lignin feedstock of some embodiments of the disclosure essentially consists of lignin, i.e. the lignin feedstock, typically a fraction of lignin, is substantially free of impurities or residues from black liquor, such as cellulose, hemicellulose, methanol, sulphur compounds and cooking chemicals from the kraft process. Typically, the lignin feedstock comprises below 1 wt % of impurities or residues from the black liquor, preferably below 1 wt %, more preferably below 0.1 wt % of sulphur compounds and cooking chemicals.

In an embodiment of the disclosure a process for converting lignin to renewable liquid product(s) is provided, wherein the process comprises the following steps,
  optionally preparing a feed mixture by mixing lignin feedstock with a solvent comprising an oil fraction, at least partly produced by the process, at a temperature between 100 and 130° C., at a pressure from 1 bar to 10 bar, for 5-30 min, or
  optionally preparing the feed mixture by mixing lignin feedstock with a solvent comprising an oil fraction, at least partly produced by the process, at a temperature between 100 and 130° C., under at a pressure from 1 bar to 10 bar, for 5-30 min, followed by filtration and obtaining the feed mixture of lignin fraction(s) and solvent as the filtrate;
  treating said feed mixture in a thermal liquefaction step, preferably a continuous thermal liquefaction step, by heating the feed mixture at a temperature between 360 and 420° C., under a pressure from 40 to 155 bar and maintaining said temperature and pressure for 3-60 minutes to obtain a product mix;
  separating a liquid product mix from said product mix; and
  recirculating at least part of said liquid product mix as the oil fraction of said solvent.

According to embodiments of the disclosure the solvent is the oil as such, or an oil fraction produced by the process itself, or comprises oil or an oil fraction, at least partly recirculated from the process itself. Typically, the solvent is or comprises a fraction such as a light and/or medium fraction separated from the product mix, preferably by fractionation, such as distillation, evaporation, liquid-liquid extraction, ultra filtration and nanofiltration. Typical light fraction(s) comprises 5- and 6-carbon cyclic structures with double bonds or saturated ring, containing keto-groups and/or 1-3-methyl groups, phenolic structures with methyl-, methoxy-, propenyl-, carboxyl-side groups, and hydrated phenantrene 3-ring structures with 3-4 double bonds in the ring and side chains. The light fraction typically has an average molecular weight of approximately 150 g/mol and the medium fraction typically has a molecular weight of between 150 g/mol and the average molecular weight of the whole oil.

According to embodiments of the disclosure the solvent further comprises other renewable hydrocarbons, oxygen containing hydrocarbons or mixtures thereof, for example crude tall oil, acid oil and/or vegetable oil. Suitable vegetable oil is for example Brassica carinata oil and/or Jatropha oil. Typically, the solvent does not comprise added alcohols, i.e. in the embodiments of the disclosure there is typically no need to add any alcohols to the solvent used for pre-treatment, i.e. for preparing the feed mixture, or directly to the thermal liquefaction step of the process.

The amount of lignin feedstock is typically 5 wt % to 35 wt % and the amount of solvent 65 wt % to 95 wt % making up the feed mixture of the embodiments of the disclosure. Preferably the amount of lignin is 8 wt % to 25 wt %, more preferably 10 to 20 wt %, including the amount of lignin being between two of the following amounts; 5 wt %, 6 wt %, 7 wt %, 8 wt %, 9 wt %, 10 wt %, 15 wt %, 20 wt %, 25 wt %, 30 wt % and 35 wt % of the feed mixture.

According to the embodiments of the disclosure, the temperature of the pretreatment step where a feed mixture is prepared by mixing lignin feedstock with a solvent, is adjusted to a temperature selected from between 100° C. and 130° C., more preferably between 110° C. and 125° C., including the temperature being a temperature between two of the following temperatures; 100° C., 105° C., 110° C., 115° C., 120° C., 125° C. and 130° C. for the heating of the mixture at a pressure from 1 to 10 bar, preferably 1 to 5 bar, more preferably 1 to 3 bar. The reaction time, or the residence time in case this step is part of the continuous process, is typically 5-30 minutes, preferably 5-15 minutes, not including the heating time. In the embodiments of the disclosure the pretreatment step can be carried out batch-wise or in continuously operated reactors.

According to the embodiments of the disclosure, the temperature of the thermal liquefaction step is adjusted to a temperature selected from between 360° C. and 420° C., more preferably between 370° C. and 400° C., including the temperature being a temperature between two of the following temperatures; 370° C., 375° C., 380° C., 385° C., 390° C., 395° C., 400° C., 405° C., 410° C., 415° C. and 420° C. for the heating of the feed mixture of the pretreatment step at a pressure from 40 to 155 bar, preferably from 50 bar to 150 bar, more preferably from 50 to 130 bar, including the pressure being between two of the following pressures; 40 bar, 45 bar, 50 bar, 55 bar, 60 bar, 70 bar, 80 bar, 90 bar, 100 bar, 110 bar, 120 bar, 130 bar, 140 bar, 145 bar, 150 bar or 155 bar.

The reaction time of the thermal liquefaction step, or residence time, in case this step is part of a continuous process, is typically 3-60 minutes, preferably 5-40 minutes, most preferably 5-30 minutes not including the heating time.

The process of the embodiments of the disclosure, or parts thereof, can be a continuous, batch or semi-batch process.

In an embodiment of the disclosure, the renewable liquid product comprising oil may be subjected to a fractionation step. A gaseous fraction, if any, one or more light and/or medium liquid fraction(s), and a heavy liquid fraction may be obtained. Further, a bottom residue fraction, typically comprising large molecules and solids, such as ash, may be separated.

In embodiments of the disclosure, the product mix or the liquid product mix may be used as a renewable product, for example in marine fuel applications or applications relating to heating or it may be directed to a hydroprocessing step.

In further embodiments of the disclosure, the light and/or medium liquid fraction(s), obtained by fractionation of the optionally washed and filtered liquid product mix, may be directed to a hydroprocessing step to obtain hydroprocessed oil, which can be used inter alia in production of chemicals, marine fuel and in drop-in fuels such as diesel, naphtha, and jet-fuel.

Figure 1:
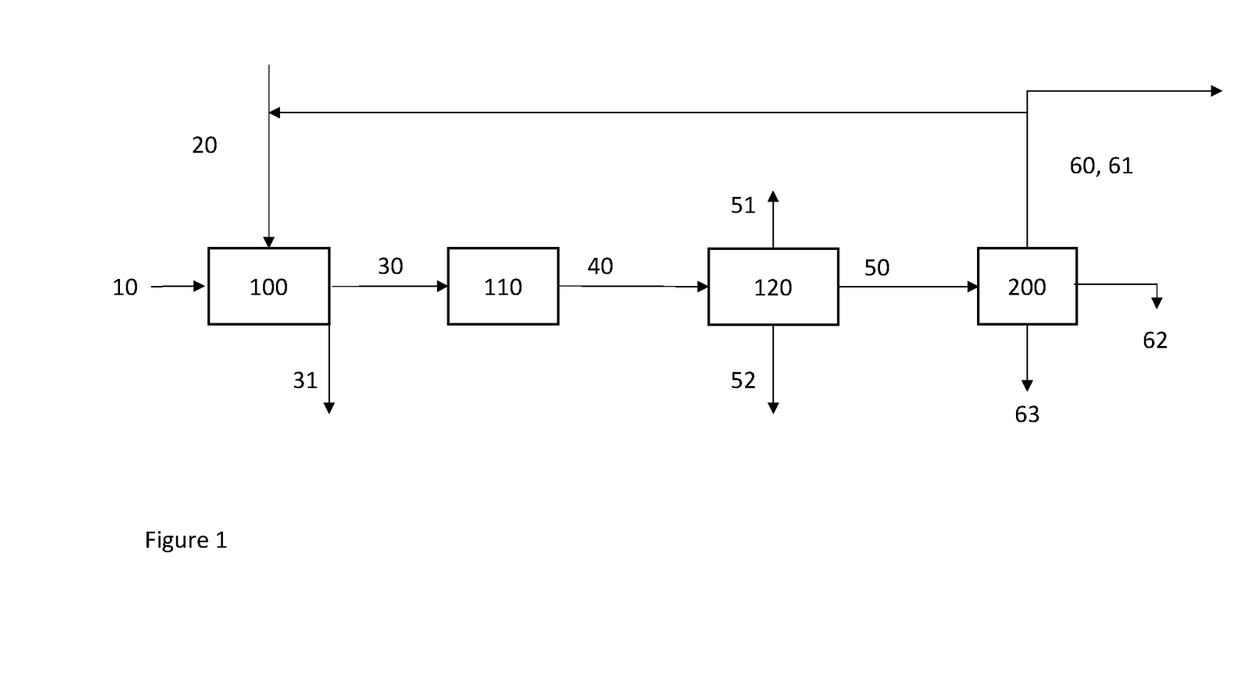
FIG. 1 shows a schematic flow diagram representing one embodiment of the conversion process.

In FIG. 1 lignin feedstock 10 is fed to a pretreatment step 100 together with solvent 20. The mixture is filtrated (not shown) and a feed mixture 30 of lignin fraction (not shown) and solvent is obtained and solids 31 are removed. The feed mixture 30 is fed to a thermal liquefaction step 110 where it is heated. The product mix 40 obtained from the thermal liquefaction step 110 is directed to separation step 120, typically comprising washing and filtration where char/solids 52 and a liquid product mix 50 are separated, optionally gas 51 is separated. The liquid product mix 50 is directed to fractionation 200 and/or optionally part of the liquid product mix 50 is directed to hydroprocessing, such as hydrotreatment or hydrocracking (not shown). The fractionation step 200 may be for example fractional distillation utilizing at least one fractionation distillation column. An optional gaseous fraction (not shown), a light fraction 60, a medium fraction 61, a heavy fraction 62 and an optional bottom residue fraction 63 are separated. Optionally at least part of the light and/or medium fraction 60, 61 is recirculated to be used as at least part of the solvent 20 in the pretreatment step 100. Optionally the light and/or medium fraction 60, 61 or part of it, is directed to hydroprocessing and/or the heavy fraction 62 is directed to a recovery boiler (not shown in the figure).

Figure 2:
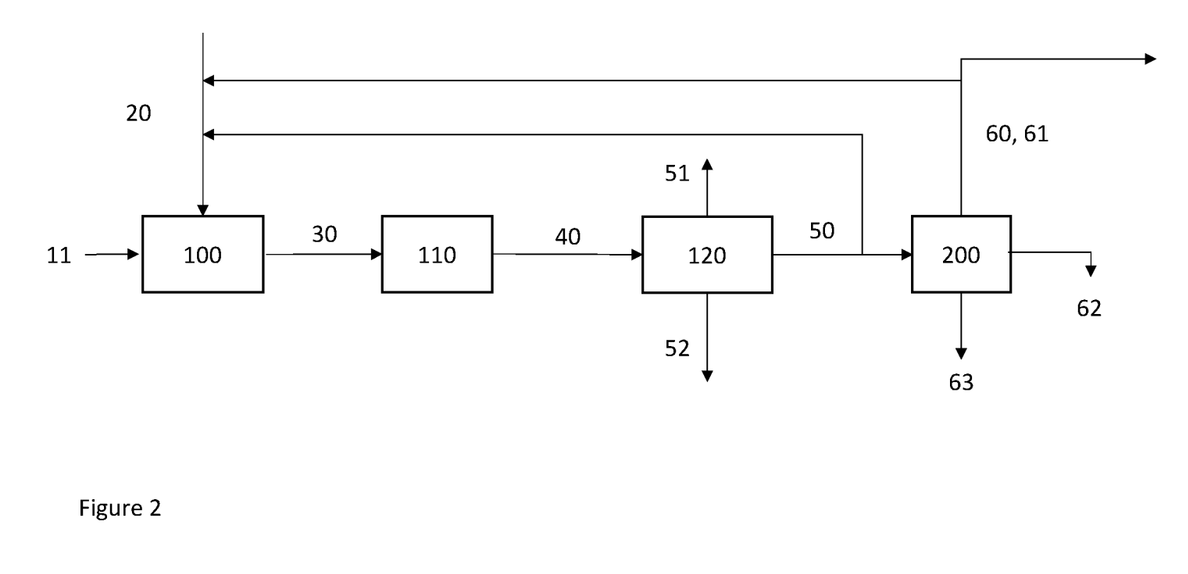
FIG. 2 shows a schematic flow diagram representing one embodiment of the conversion process.

In FIG. 2 lignin feedstock 10 is fed to a pretreatment step 100 together with solvent 20. The obtained feed mixture 30 is then fed to a thermal liquefaction step 110 where it is heated. The product mix 40 obtained from the thermal liquefaction step 110 is directed to separation step 120, typically comprising washing and filtration where char/solids 52 and a liquid product mix 50 are separated, optionally gas 51 is separated. The liquid product mix 50 is directed to fractionation 200 and/or optionally at least part of the liquid product mix 50 is recirculated to be used as at least part of the solvent 20 in the pretreatment step 100. Optionally part of the liquid product mix 50 is directed to hydroprocessing, such as hydrotreatment or hydrocracking (not shown). The fractionation step 200 may be for example fractional distillation utilizing at least one fractionation distillation column. An optional gaseous fraction (not shown), a light fraction 60, a medium fraction 61, a heavy fraction 62 and an optional bottom residue fraction 63 are separated. Optionally at least part of the light and/or medium fraction 60, 61 is recirculated to be used as at least part of the solvent 20 in the pretreatment step 100. Optionally the light and/or medium fraction 60, 61 or part of it, is directed to hydroprocessing and/or the heavy fraction 62 is directed to a recovery boiler (not shown in the figure).

Lignin

The lignin feedstock of the embodiments of the disclosure is obtained from different sources and produced in different ways that involves separation of lignin. Examples of different lignin sources are kraft lignin obtained from kraft pulping, lignosulfonate lignin obtained from a sulfite pulping process, soda lignin from pulp mills using a soda pulping process and organosolv lignin where lignin is isolated from carbohydrates in lignocellulosic biomass using organic solvents, also the lignin obtained in the lignocellulosic ethanol production.

Typically, the lignin feedstock is kraft lignin, which essentially consists of lignin, i.e. the feedstock is substantially free of impurities or residues from black liquor, such as cellulose, hemicellulose, methanol, sulphur compounds and cooking chemicals from the kraft process, preferably the lignin feedstock comprises less than 10 wt %, more preferably the lignin comprises less than 5 wt % % and most preferably less than 1 wt % of impurities or residues from the black liquor. Preferably the lignin is cellulose-free.

The kraft process (also known as kraft pulping or sulfate process) is a process for conversion of wood into wood pulp, which consists of almost pure cellulose fibers, the main component of paper. The process involves the conversion of wood to pulp using an aqueous mixture containing sodium hydroxide and sodium sulphide. These chemicals remove the lignin links between cellulose fibres, thereby releasing the fibres and producing water-soluble compounds. The kraft pulping process is well-known and it is known that it removes most of the lignin originally present in the wood. The liquid separated from pulp is commonly referred to as "crude black liquor" or "weak black liquor". The term "black liquor" refers to the aqueous liquid residue of the kraft pulping process which has been separated from solid wood pulp (cellulose fibres). The black liquor contains dissolved wood degradation products such as lignin and hemicellulose fragments, as well as methanol, sulphur compounds and dissolved inorganic solids such as spent pulping chemicals. The methanol content is typically in the range of 0.5-1.5 wt. % based on the mass of dry solids. Sulphur compounds are typically contained in the black liquor in an amount of 2-7 wt. % based on the mass of dry solids.

An acidification process has been considered as an efficient and economical process for the isolation of lignin from black liquor. One example of black liquor acidification for lignin extraction is adding acid e.g., sulfuric acid to change the pH of black liquor. Other typical processes for obtaining lignin from black liquor are using filtration and ultrafiltration.

A typical lignin feedstock of the embodiments of the disclosure is a composition comprising 15-98 wt % organics, 0.1-15 wt % ash and/or 1.5-80 wt % water. Typically, the oxygen content of the composition is below 40 wt %, preferably from 20 to 36 wt %, most preferably from 25-36 wt % daf (dry-ash-free). In preferred embodiments of the disclosure; the amount of organics is 30-98 wt %, more preferably 30-70 wt %, most preferably 50-70 wt %; the amount of ash is 0.1-7 wt %, more preferably 0.1-3 wt %, most preferably 0.1-1 wt %, including the ash content being between two of the following values; 0.1 wt %, 0.2 wt %, 0.3 wt %, 0.4 wt %, 0.5 wt %, 1 wt %, 1.5 wt %, 2 wt %, 2.5 wt %, 3 wt %, 3.5 wt %, 4 wt %, 5 wt %, 6 wt %, 7 wt %, 8 wt %, 9 wt %, 10 wt %, 11 wt %, 12 wt %, 13 wt %, 14 wt % and 15 wt %; and/or the amount of water is 20-70 wt %, more preferably 25-70 wt %. If needed, the lignin feedstock can be dried. The moisture content of the lignin feedstock entering the process of the disclosure is typically below 35 wt %, preferably below 25 wt %, more preferably below 20 wt %.

The lignin feedstock is chosen based on its molecular weight and optionally also its polydispersity. Typically, the lignin feedstock is fraction(s) of lignin, obtained by filtration, nanofiltration, acid precipitation process or membrane fractionation. Lignin can be subjected to gradient acid precipitation to obtain lignin fractions with narrow molecular weight distribution. During gradient acid precipitation lignin fractions obtained at higher pH value exhibit higher molecular weight compared with the fractions obtained at lower pH. The fractionation can also be achieved by dissolving lignin in solvent used in the solvolysis, followed by filtration where after a feed mixture of a lignin fraction and solvent is obtained as the filtrate. Since small particles have larger surface area they dissolve better and a fraction of lignin with a lower molecular weight is obtained as filtrate. Typically, the average molecular weight of the lignin feedstock is below 6500 g/mol, preferably below 4000 g/mol, more preferably below 2000 g/mol, most preferably below 1500 g/mol. Typically, the polydispersity of the lignin feedstock is 1.2 to 6, preferably 1.2 to 4.5, more preferably 1.2 to 2.5.

In embodiments of the disclosure the lignin feedstock is typically a fraction of kraft lignin, which is separated from black liquor, having an average molecular weight below 6500 g/mol, preferably below 4000 g/mol, more preferably below 2000 g/mol, most preferably below 1500 g/mol.

The molecular weight distribution can for example be determined using Gel Permeation Chromatography (GPC). GPC is an analytical technique that separates dissolved macromolecules by size based on their elution from columns filled with a porous gel. GPC/SEC employs a stagnant liquid present in the pores of beads as the stationary phase, and a flowing liquid as the mobile phase. The mobile phase can therefore flow between the beads and also in and out of the pores in the beads. The separation mechanism is based on the size of the polymer molecules in solution. Bigger molecules will elute first. Small molecules that can enter many pores in the beads take a long time to pass through the column and therefore exit the column slowly. To determine the molecular weights of the components of a polymer sample, a calibration with standard polymers of known weight must be performed. Values from the unknown sample are then compared with the calibration graph. This method is relative and retention times depends on the used column material, eluent and how similar the used standards are compared to the samples.

Optional Fractionation of the Product Mix

The obtained product mix may optionally be fractionated in a fractionation step before being used as a renewable product. A gaseous fraction, if any, one or more light and/or medium fraction(s) and a heavy fraction as well as a bottom residue fraction comprising solids, if any, may be obtained. The fractionation may be carried out after washing, filtering and/or drying the product mix.

The gaseous fraction typically comprises water, carbon dioxide and light gaseous ($C_1$-$C_4$) compounds.

The vacuum residue of the product mix is typically above 10 wt. %. The heavy fraction may be directed to hydrocracking, energy production, recovery boiler, etc.

In an embodiment, the liquid product mix may be directed to a hydroprocessing step without fractionation.

In embodiments of the disclosure, one of the fractions, typically a light or medium fraction, obtained by fractionation of said product mix or liquid product mix, may be directed to a hydroprocessing step and/or at least part of the fraction may be used as solvent in the pretreatment step of the process.

The fractionation may be carried out as evaporation, distillation, extraction, ultra filtration, nanofiltration or as a combination of any of these.

Fractions comprising the gaseous fraction, the light and/or medium liquid fraction(s) and the heavy liquid fraction can be separated. A person skilled in the art is able to vary the fractionation/distilling conditions and to change the temperature cut point as desired to obtain any desired fraction, boiling in the predetermined ranges.

Alternatively, a combination of different methods may also be used.

Optional Hydroprocessing Step

In the embodiments of the disclosure, the product mix, the light fraction obtained for example by fractionation of the product mix, or any other fraction of the product mix, may be subjected to a catalytic hydroprocessing step carried out in the presence of hydrogen, to yield an effluent, which may be subjected to a second fractionation and/or further processing steps for providing liquid fuels and other chemicals. Gasoline fractions that can be used as a bio-naphtha component or as raw material for bio-plastics may also be produced.

The hydroprocessing step may be carried out for effecting at least one of hydrodeoxygenation, hydrodewaxing, hydroisomerization, hydrocracking, hydrodearomatization and ring opening reactions.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina ($Al_2O_3$), gamma-alumina, zeolite-alumina, alumina-silica ($SiO_2$), $ZrO_2$, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, suitably from 30 to 120 bar.

In an embodiment, hydrogen partial pressure is maintained in the range from 50 to 250 bar, suitably from 80 to 200 bar, particularly suitably from 80 to 110 bar.

The hydroprocessing is carried out at a temperature in the range of 100 to 450° C., suitably 280° C. to 450° C., more suitably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is suitably in the range of 0.1-5 and preferably in the range of 0.3-0.7.

The ratio of H2/feed varies between 600 and 4000 Nl/l, suitably of 1300-2200 Nl/l.

The feed is pumped to the hydroprocessing reactor at a desired speed. Suitably the feed rate LHSV (liquid hourly space velocity) of the feed material is in the range of 0.01-10 h−1, suitably 0.1-5 h−1.

The hydroprocessing step may be carried out as at least one-step process or as at least two-step process.

The liquid hydrocarbon stream obtained from the hydroprocessing includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

EXAMPLES

Analysis Methods Used in the Examples

Gas samples were analysed with an off-line Varian rapid gas chromatograph RGA-450GC with two analytical columns (10 m Molsieve 5A and 10 m PPQ), and with an off-line Agilent 7890A gas chromatograph equipped with three analytical columns and three different detectors (0.9 m Supelco 12255 U column and TCD detector for the quantification of CO2 and H2S, 10 m DB1 column and FID detector for the quantification of light hydrocarbons and, 10 m Moisieve 5A column and TCD detector for the quantification of O2, H2, N2 and CO), using helium as carrier gas in all cases.

The molecular weight distribution of the lignin fractions was determined with a Gel Permeation Chromatograph (GPC) using a Dionex Ultimate 3000 Autosampler (column compartment and pump), Dionex Ultimate 3000 Diode Array Detector and as a reflective index detector, Shodex RI-101. The columns were PSS MCX columns, precolumn and two analytical columns of sulfonated divinylbenzen copolymer matrix (1000 Å and 100 000 Å). The syringe filters were 0.45 µm and glass sample bottles for STD samples. Sample filtration was performed with a Mini-Uniprep syringeless filter device PTFE or Nylon, 0.45 µm. For prefiltration 5 µm syringe filter was used.

The eluent was prepared from high quality deionized water of low resistivity (18 MΩ-cm or better) that contains as little dissolved carbon dioxide as possible was used to prepare the eluent. The water was also free of biological contamination (e.g., bacteria and molds) and particulate matter. The water was first degassed and after this, the water was poured carefully into 2000 ml measurement bottle and exactly 10.4 ml of 50% NaOH were added. The standard samples for calibration were prepared by weighting approximately 50 mg of each standard into a 10 ml measuring bottle and ultrapure water was added and filled into a mark. Standards were filtered with PTFE 0.45 µm syringe filters. After running the calibration samples, calibration results were integrated and processed in the processing method and saved. The strong alkaline liquor samples were diluted normally 1:100 and filtered with PTFE syringe filters (0.45 µm) to vials. Ready samples were load into autosampler and sample information was added to sample sequence. Injection volume was 20 µl. After the samples 1 M NaOH was injected as a sample to clean the column. The instrument parameters were the following flow rate 0.5 ml/min, eluent 0.1 M NaOH, column oven temperature 30° C., isocratic run and run time 48 minutes. The results were integrated, and the following parameters were reported: number average molar mass Mn, mass average molar mass Mw, and polydispersity PD. The results are reported as integers.

The molecular weight distribution of the oil phase was determined with a Gel Permeation Chromatograph (GPC) of the Agilent 1200 series, applying IR and UV light (wavelength 254 nm) and 3 GPC PLgel 3 Im MIXED-E columns placed in series. The columns were operated at 40° C. and tetrahydrofuran (THF) was used as a solvent. Calibration was performed with a solution of polystyrene with molecular weights ranging from 162 to 30230 g/mol.

Calculation of Average Molecular Weight and Polydispersity $$M_n = \frac{\sum n_i M_i}{\sum n_i} \quad \text{(Eq. 1)}$$

$$M_w = \frac{\sum w_i M_i}{\sum w_i} \quad \text{(Eq. 2)}$$

$$PD = \frac{M_w}{M_n} \quad \text{(Eq. 3)}$$

where: $M_i$ is the molecular weight of molecules i, $n_i$ is the number of molecules with molecular weight i and $w_i$ is the mass of the molecules with molecular weight i. $M_w$ is weight average molecular weight, $M_n$ is the number average molecular weight and PD is the dispersity.

The elemental composition of the liquid and solids was determined with an Interscience Flash 2000 elemental analyser. The water content of the aqueous phase was determined by Karl Fischer titrations using Hydranal composite 5, Metrohm 787 KFTitrino as titrant. The pH of the aqueous phase, obtained after the experiments, was measured with a Metrohm 785 DMP titrino apparatus.

The contents of ash, volatile matter, moisture and fixed carbon in the lignin (proximate analysis) were determined by measuring weight loss upon heating. These constituents will add up to 100%. Ash content determination was performed by heating a lignin sample in air at a slow heating rate (5° C./min). Once the temperature reached 550° C. it was kept constant for 6 hours before the sample was weighted. The remaining weights measured at 520° C. represent the ash contents at these temperatures.

The combined content of fixed carbon and volatiles was determined by slowly heating a lignin sample (5° C./min) in nitrogen to 950° C. where it was maintained for 10 minutes before it was weighted. The measured weight loss represents the combined content of water and volatiles. The remaining weight represents the content of fixed carbon.

The moisture content of the lignin was determined by a PMB-53 moisture analyzer of Adam Equipment.

Calculations of Mass Balance and Yields

The mass balance distinguishes four different product phases—oil (o), aqueous phase (aq), gas (g) and solids (s). The produced amounts of each phase are determined as follows:
1. Oil—is the liquid phase collected after the experiment.
2. Aqueous phase organics (water soluble organics—WSO) remain in the oil phase. Only when 20 wt % of water was used in the slurry mixture of lignin and lights, a separate water layer was observed which contains almost no organics molecules.
3. Gas—From the known volume of produced gas and GC composition, the weight of total gas is calculated and the amount of measured N2 is subtracted. The known volume of produced gas and the average molar weight of 33 g/mol are used calculate the amount of gas produced. Nitrogen is subtracted based on the initial pressure and the approximate initial volume taken up by gas phase in the reactor at the start of an experiment.

4. Solids (char)—The amount of solids is determined directly by weighing dried solids when withdrawn from the oven.

Since all yields are given on dry lignin basis, the amount of dry lignin fed in the autoclave is corrected for initial lignin moisture as follows:

$$m_{lignin,dry} = m_{lignin} \cdot (1 - w_{moisture,lignin}) \quad \text{(Eq.4)}$$

The gas and solid yields are calculated by:

$$Y_{product} = \frac{m_{product}}{m_{lignin,dry}} \quad \text{(Eq. 5)}$$

$Y_S$ is used for the solids and $Y_G$ for the gas. The oil yield is calculated as 100 minus gas and char. When the yields are expressed on the lignin intake, all solids and gas are first ascribed to the lignin after that, the amount of gas produced from the lights only are subtracted from the gas production from the lignin. The oil yield from lignin follows from 100 minus gas and solids from lignin.

Vacuum Residue and Average Molecular Weight

Both vacuum residue (VR) and average molecular weight ($M_W$) are excerpted from GPC analysis. The parameters are based on the results from the refractive index detector (RID) of the GPC analyser. Molecular weight is taken directly from the GPC output file, whereas vacuum residue is calculated as follows:

$$VR = \frac{\text{Area of molecules heavier than 1000 g/mol}}{\text{Total Area}} \quad \text{(Eq. 6)}$$

The areas are calculated using numerical integration (trapezoidal method).

$$\text{Area} = \int_{\log M_{w,1}}^{\log M_{w,2}} \text{RID} \, d(\log M_W) \quad \text{(Eq. 7)}$$

Oxygen Content

With the applied recovery procedure, a small fraction of water always remained in the oil phase. Therefore, the oxygen content is corrected for the oxygen in water. The water content of the oil sample ($KFT_{oil}$ in wt. %) is known from Karl Fischer titration and therefore the obtained oxygen content including that of water ($O_{wet}$) can be corrected to obtain the oxygen content of the oil on dry basis (O):

$$O = \frac{O_{wet} - \frac{16}{18} \cdot KFT_{oil}}{\left(1 - \frac{KFT_{oil}}{100}\right)} \quad \text{(Eq. 7)}$$

The same procedure holds for the hydrogen content in the oil:

$$H = \frac{H_{wet} - \frac{2}{18} \cdot KFT_{oil}}{\left(1 - \frac{KFT_{oil}}{100}\right)} \quad \text{(Eq. 9)}$$

Example 1. Pretreatment of Lignin Feedstock With Solvent

A lignin feedstock with 35 wt % moisture was dried to a moisture content below 1 wt %. 3.2 kg or 6 kg of the dried lignin feedstock of Table 1 (8 or 15 wt. % by dry weight) and 36.8 or 34 kg m-cresol, respectively. The mixtures were placed in a reactor vessel and heated to a temperature of 120° C. at 1-2 bar pressure. Cresol was selected as model compound for the light phase of the produced solvolysis oils and represents the recirculation in which the solvolysis of lignin occurs. The mix was mixed for 60 minutes and the obtained feed mixture was used as pumpable feedstock for the continuous solvolysis plant.

TABLE 1

| Kraft lignin composition of dried lignin feedstock | |
| --- | --- |
| Ash, wt % | <1 |
| Organics, wt % | 99 |
| Moisture, wt % | <1 |
| Molecular weight Mw, g/mol | 3406 |

Example 2. Continuous Thermal Liquefaction Step

The feed mixtures obtained in Example 1 were used for continuous solvolysis. The reactor temperature of the was 380° C. and the reaction time was 10 minutes (at set-point). The feeding rate was 5-10 kg/hr and the pressure was constant between 45 and 50 bar. The cooling temperature of the product vessel was 30° C. The experiment with 8 wt % of dry lignin is shown in Table 2. The oil yield was 88 wt % and contains about 2 wt % of water. Similar results were obtained with 15 wt % of dry lignin. The lignin feedstock had an oxygen content of 30.1 wt %. The lignin/m-cresol slurry had an oxygen content of 16.1 wt %. The oxygen content of the slurry was reduced to 14 wt % after solvolysis. The de-oxygenation comes predominately from the lignin as the m-cresol is thermally stable.

TABLE 2

| Yields after solvolysis of 8 wt % of dry lignin feedstock | | | | |
| --- | --- | --- | --- | --- |
| Oil yield wt % | Solid yield wt %, dry | Gas yield wt %, dry | Oxygen wt %, dry | VR % |
| Feed, 8 wt % lignin, dry  88 | 4 | 8 | 14 | 28 |

Example 3. Solvolysis of Lignin in the Light Fraction

Several lignin feedstocks of the same lignin feedstock as used in Example 1, varying in moisture content, were used in these examples. The first example had 15 wt % dry lignin as feedstock. In the second example the lignin was wet (35 wt % of water) but the dry lignin content in lights was kept at 15 wt %. The third experiment was comparable to example 1 but 20 wt % of water was added to the whole mixture of dry lignin and lights while keeping the dry lignin content at 15 wt %. The reactor temperature of the thermal liquefaction step was 380° C. and the reaction time was 10 minutes (at set-point). The yields on total organics as well as on lignin basis are shown in Table 3. The yield on lignin basis (between brackets [ ]) was corrected for the gas produced from the solvent (lights). The lignin produced only 2.6 and 7.1 wt % of gas and almost no solids. The oil yield, based on the lignin feedstock, varied between 92.5 and 97.3 wt %.

TABLE 3

Yields on total organics and on lignin

| | Water content of feed mix wt % | Gas yield wt %, dry | Solid yield wt %, dry | Oil yield wt %, dry | Oxygen content wt %, dry | Mw g/mol | Pressure bar |
|---|---|---|---|---|---|---|---|
| Lights only | — | 1.0 | | 99.0 | 15 | 151 | |
| Lights + dry lignin | 1 | 1.6 [5.4] | 0.2 [1.1] | 98.2 [93.6] | 16 | 423 | 65 |
| Lights + wet lignin | 9 | 1.2 [2.6] | 0.1 [0.2] | 98.0 [97.3] | 15 | 389 | 92 |
| Lights + dry lignin + 20 wt % water | 20.4 | 2.0 [7.1] | 0.1 [0.4] | 97.8 [92.5] | 15 | 578 | 145 |

As can be seen from Table 3, the increased water content did not have a significant impact on the yield. A clear water layer was observed on top of the product at 20 wt % water and could be easily removed.

The liquid product was fractionated, and the light fraction was used as solvent in the pretreatment step. The light fraction can also be hydrotreated. Alternatively, or in addition the liquid product mix from the thermal liquefaction can as such, without fractionation, be hydrotreated and/or recirculated to the pretreatment.

Example 4. Solvolysis of Three Lignins with Different Molecular Weight and Ash Content Lignin fractions of different molecular weights were prepared by using ultra- and nanofiltration to separate lignin form black liquor. After the filtration the pH (below 2) of the retentate was changed to precipitate the lignin. The lignin was then washed with acidic water (pH below 2) to remove metals, and then vacuum dried (at a temperature below 60° C.).

Three different lignins according to Table 4, were used as feedstock for solvolysis. The lignins differed in molecular weight and ash content.

TABLE 4

The composition of the lignins used in solvolysis

| Type of lignin | Lignin 1 | Lignin 2 | Lignin 3 |
|---|---|---|---|
| Ash 900° C., | 3.2 | 1.8 | 0.4 |
| Mw g/mol | 8166 | 1014 | 3406 |
| PD | 5.9 | 4.2 | 5.8 |
| Lignin wt % | 96.8 | 98.2 | 99.6 |

The lignins were dried before the solvolysis in the light phase of the solvolysis oil product obtained after distillation. The temperature was 380° C. and the reaction time 20 minutes. As can be observed from Table 5, the average Mw of the oil depends on the average Mw of the feedstock. The lower the Mw of the feedstock, the lower the Mw of the product. Likely, heavy molecules produced after solvolysis of Lignin 1, were recovered as solids after solvolysis and are therefore removed from the oil. Both, lignin 2 and 3 produce very small amounts of solids.

TABLE 5

Solvolysis results of different lignin feedstocks; product yields, Mw and oxygen content.

| Lignin | Mw feed g/mol | Gas yield wt %, dry | Solid yield wt %, dry | Oil yield wt %, dry | Water yield wt %, dry | Oxygen content wt %, dry | Mw oil g/mol |
|---|---|---|---|---|---|---|---|
| 1 | 8166 | 8 | 20 | 64 | 8 | 15.9 | 1520 |
| 2 | 1014 | 9 | 1 | 81 | 9 | 15.4 | 1092 |
| 3 | 3406 | 5 | 1 | 86 | 8 | 15.4 | 1444 |

For all the samples measured, the PD of the oil, that shows the broadness of a molecular weight distribution was between 1.2 and 2.

Example 5. Solvolysis of Lignin and Extracted Lignin with Different Molecular Weight The solvolysis product was subjected to distillation in vacuum at 180° C. In the distillation process two fractions were obtained, a light fraction (12 wt % of the oil) and an oil residue (88 wt % of the oil). This residue was a viscous liquid at atmospheric conditions.

The light fraction obtained in the vacuum distillation was used as solvent/extractant in the solvolysis process. The solvolysis feedstock was prepared by mixing 15 wt-% of lignin of Table 1 in the light fraction and this mixture was heated to 80° C. for 10 minutes at atmospheric pressure. After the heating step, only part of the lignin dissolved in the lights and the undissolved lignin was separated by filtration. After the filtration, the lignin content in the filtrate was 8.5 wt-%. Thus, 8.5 wt % of the lignin was extracted. The solvolysis results of the feed mixture comprising the extracted lignin and the feed mixture comprising the whole lignin feedstock were compared.

The conditions used in the solvolysis were 380° C., 10 min, no mixing. The whole graph areas were first normalized to correct for the difference in concentration of lignin (15 wt % dry) and extracted lignin (8.5 wt % dry) in the feedstock. The results are shown as Intensity vs. log Mw (g/mol) and only for molecule sizes between 1000 and 10000 g/mol because these large molecules are of interest and there is no interference with the Mw of the light fraction. The results are presented in FIG. 3.

Figure 3:
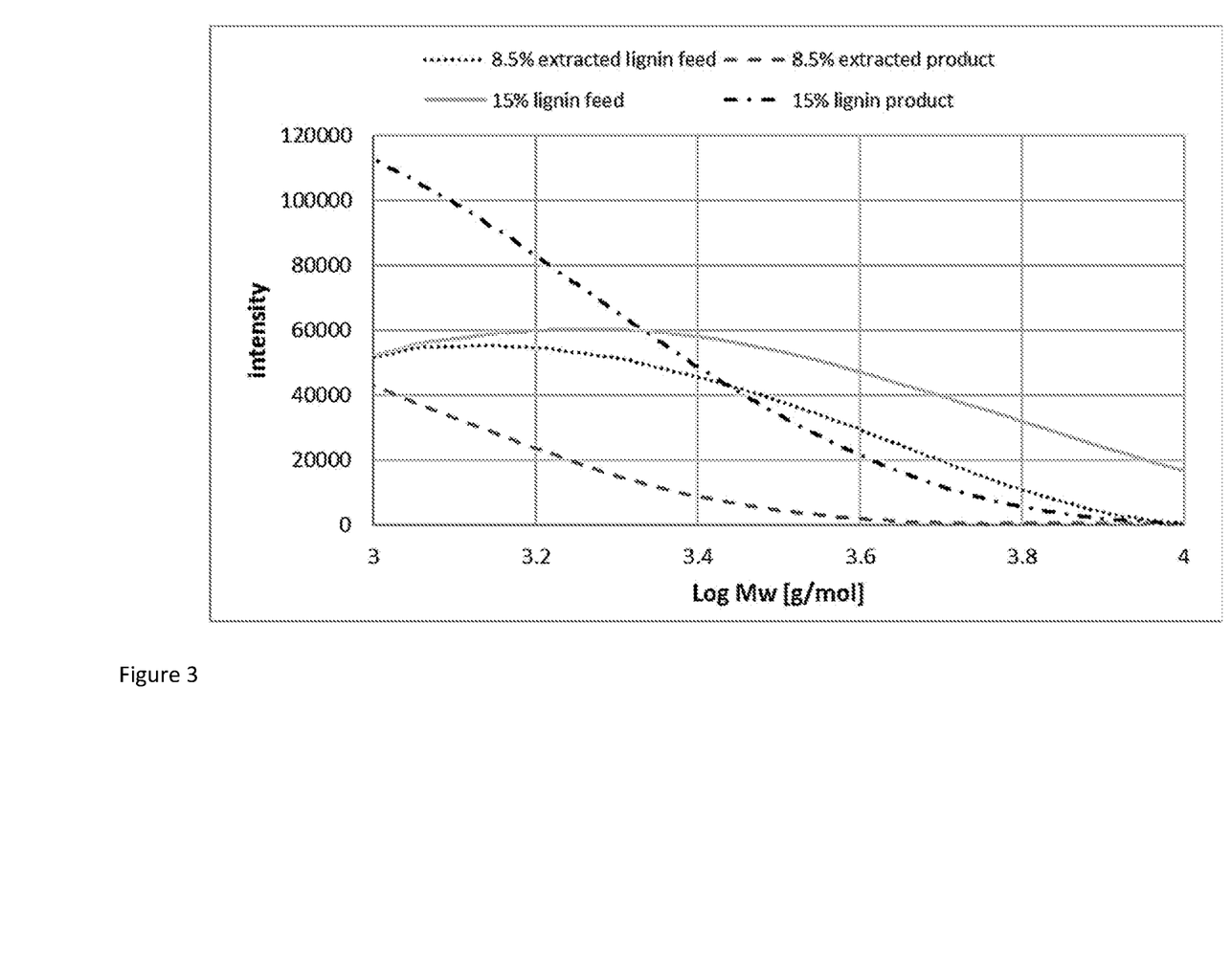
FIG. 3 shows average molecular weight ($M_w$) distribution for feeds and products of solvolysis of one embodiment of a process according to the disclosure.

The solid production was around 1 wt % using the whole lignin feedstock. When using the extracted lignin as feedstock no solids were observed, almost all the lignin ended up as liquid with a minor amount of gas produced. When comparing the Mw for the 15 wt-% of lignin in the light fraction with the one containing 8.5 wt-% extracted lignin, it can be observed that the amount of heavy molecules in the feed is lower after extraction compared to the whole lignin feed. When comparing the solvolysis products, the extracted feedstock contains fewer heavy molecules compared to the whole feedstock. It can be concluded that the procedure helped to separate large molecules from the feed mixture and as a result a lighter oil can be obtained.

The invention claimed is:

1. A process for converting lignin to renewable liquid product(s), characterized in that the process comprises the following steps,
   (a) treating a feed mixture (30) of lignin feedstock (10) and solvent (20) in a thermal liquefaction step by heating (110) the feed mixture (30) at a temperature between 360 and 420° C., under a pressure from 40 to 155 bar and maintaining said temperature and pressure for 2-60 minutes to obtain a product mix (40), wherein the lignin feedstock has an average molecular weight below 6500 g/mol and comprises less than 10 wt % of impurities; and (b) separating (120) a liquid product mix (50) from said product mix (40); and (c) recirculating at least part of said liquid product mix (50) as an oil fraction of said solvent (20).

2. The process according to claim 1, characterized in that the process further comprises providing lignin feedstock by filtration, nanofiltration, acid precipitation process or membrane fractionation of a lignin source.

3. The process according to claim 1, characterized in that the process further comprises preparing the feed mixture (30) by mixing (100) lignin feedstock (10) with a solvent (20) comprising the oil fraction, at least partly produced by the process, at a temperature between 100 and 130° C., under at a pressure from 1 bar to 10 bar, for 5-30 min.

4. The process according to claim 3, characterized in that preparing the feed mixture (30) is performed at a temperature from 110° C. and 125° C., at a pressure from 1 bar to 3 bar and/or for 5-15 minutes.

5. The process according to claim 1, characterized in that the process further comprises preparing the feed mixture (30) by mixing (100) lignin (10) with a solvent (20) comprising the oil fraction, at least partly produced by the process, at a temperature between 100 and 130° C., under at a pressure from 1 bar to 10 bar, for 5-30 min, followed by filtration and obtaining the feed mixture of lignin fraction(s) and solvent as the filtrate.

6. The process according to claim 1, characterized in that the lignin feedstock (10) has a molecular weight below 4500 g/mol.

7. The process according to claim 1, characterized in that an aqueous phase is separated in step (b) before at least part of said liquid product mix (50) is recirculated as the oil fraction of said solvent (20).

8. The process according to claim 1, characterized in that the lignin feedstock (10) comprises 15-98 wt % organics, 0.1-15 wt % ash and/or 1.5-80 wt % water.

9. The process according to claim 1, characterized in that the lignin feedstock (10) comprises below 40 wt % oxygen daf (dry-ash-free).

10. The process according to claim 1, characterized in that the process is a continuous, batch or semi-batch process.

11. The process according to claim 1, characterized in that the lignin feedstock (10) is kraft lignin separated from black liquor.

12. The process according to claim 1, characterized in that step (b) separation (120) is followed by fractionation (200) to obtain one or more oil fraction(s) (60, 61) and a heavy fraction (62) and optionally a bottom residue fraction (63) and/or a gaseous fraction and optionally recirculating one oil fraction (60) as the oil fraction of the solvent.

13. The process according to claim 1, characterized in that the oil fraction is a fraction obtained by fractionation (200) of the product mix (40) from the thermal liquefaction step (110) or of the liquid product mix (50) obtained after separation (120).

14. The process according to claim 13, characterized in that at least part of the oil fraction from said fractionation (200) is directed to a hydroprocessing step.

15. The process according to claim 1, characterized in that the solvent further comprises renewable hydrocarbons, oxygen containing hydrocarbons or mixtures thereof.

16. The process according to claim 1, characterized in that the amount of lignin feedstock is 5 wt % to 35 wt % of the feed mixture.

17. The process according to claim 1, characterized in that the thermal liquefaction of step (a) (110) is performed at a temperature from 360° C. to 420° C. at a pressure from 50 to 150 bar and/or for 3-60 minutes.

18. The process according to claim 1, characterized in that the lignin feedstock (10) has a molecular weight below 3500 g/mol.

19. The process according to claim 1, characterized in that the lignin feedstock (10) has a molecular weight below 2000 g/mol.

20. The process according to claim 1, characterized in that the lignin feedstock (10) has a molecular weight below 1500 g/mol.

21. The process according to claim 1, characterized in that the amount of lignin feedstock is 8 wt % to 25 wt % of the feed mixture.

22. The process according to claim 1, characterized in that the amount of lignin feedstock is 10 to 20 wt % of the feed mixture.

23. The process according to claim 1, wherein the feed mixture does not comprise an alcohol.

* * * * *